(12) United States Patent
Tanaka (10) Patent No.: US 11,736,384 B2
(45) Date of Patent: *Aug. 22, 2023

(54) COMMUNICATION SYSTEM, NODE, COMMUNICATION METHOD, AND COMPUTER PROGRAM PRODUCT

(71) Applicant: KABUSHIKI KAISHA TOSHIBA, Tokyo (JP)

(72) Inventor: Yasuyuki Tanaka, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,663

(22) Filed: Feb. 25, 2022

(65) Prior Publication Data

US 2023/0077817 A1 Mar. 16, 2023

(30) Foreign Application Priority Data

Sep. 15, 2021 (JP) ................................ 2021-150318

(51) Int. Cl.
*G06F 15/173* (2006.01)
*H04L 45/122* (2022.01)
(Continued)

(52) U.S. Cl.
CPC ............ *H04L 45/122* (2013.01); *H04L 45/02* (2013.01); *H04L 45/121* (2013.01); *H04L 45/20* (2013.01); *H04L 45/42* (2013.01)

(58) Field of Classification Search
CPC ..... H04L 45/122; H04L 45/02; H04L 45/121; H04L 45/20; H04L 45/42
(Continued)

(56) References Cited

U.S. PATENT DOCUMENTS

| 8,599,822 B2* | 12/2013 | Castagnoli | .............. | H04L 45/48 709/239 |
| 8,774,051 B2* | 7/2014 | Yamamoto | .............. | H04L 45/42 370/338 |

(Continued)

FOREIGN PATENT DOCUMENTS

| CA | 2982637 A1 * | 6/2018 | .............. H04W 4/70 |
| JP | 2022-20452 A | 2/2022 | |
| JP | 2022-21817 A | 2/2022 | |

OTHER PUBLICATIONS

S. Biswas et al., "ExOR: Opportunistic Multi-Hop Routing for Wireless Networks," ACM SIGCOMM Computer Communication Review, vol. 35, No. 4, pp. 133-143 (2005).

(Continued)

*Primary Examiner* — Anthony Mejia
(74) *Attorney, Agent, or Firm* — Finnegan, Henderson, Farabow, Garrett & Dunner, LLP (57) ABSTRACT

According to an embodiment, a node of a communication system includes a memory and one or more processors coupled to the memory. The one or more processors are configured to: determine, when receiving a packet including path information that indicates a parent-child relationship of transfer nodes included on a network topology from a source node to a destination node, whether at least one of its own node and a neighboring node is included in the path information as the transfer node; specify a distance between the own node and the destination node when at least one of the own node and the neighboring node is included in the path information; and transmit a confirmation response for the packet to the wireless multi-hop network after a waiting time corresponding to the distance, and transfer the packet when a confirmation response is not received from the neighboring node during the waiting time.

9 Claims, 8 Drawing Sheets

(51) Int. Cl.
*H04L 45/00* (2022.01)
*H04L 45/02* (2022.01)
*H04L 45/121* (2022.01)
*H04L 45/42* (2022.01)

(58) Field of Classification Search
USPC .......................................................... 709/238
See application file for complete search history.

(56) References Cited

U.S. PATENT DOCUMENTS

| | | | |
|---|---|---|---|
| 10,244,525 B2 | 3/2019 | Thubert et al. | |
| 10,448,326 B2 | 10/2019 | Jin et al. | |
| 2010/0157888 A1* | 6/2010 | Aggarwal | H04L 45/48 370/328 |
| 2012/0099585 A1* | 4/2012 | Yamamoto | H04L 45/42 370/389 |
| 2016/0212507 A1 | 7/2016 | Du et al. | |
| 2022/0022212 A1* | 1/2022 | Tanaka | H04W 72/535 |
| 2022/0030499 A1* | 1/2022 | Tanaka | H04W 40/02 |
| 2022/0295377 A1 | 9/2022 | Zhu | |

OTHER PUBLICATIONS

S. Duquennoy et al., "Let the tree Bloom: scalable opportunistic routing with ORPL," Proc. of 11$^{th}$ ACM Conf. on Embedded Networked Sensor Systems, Article No. 2, 14 pages (2013).

T. Winter et al., "RPL: IPv6 Routing Protocol for Low-Power and Lossy Networks," Internet Engineering Task Force (IETF), RFC 6550, 157 pages (2012).

Sanjit Biswas, et al., "ExOR: Opportunistic Multi-Hop Routing for Wireless Networks," SIGCOMM'05, pp. 133-143, (2005).

Simon Duquennoy, et al., "Let the Tree Bloom: scalable opportunistic routing with ORPL," SenSys' 13, 15 pages (2013).

T. Winter, et al., "RPL: Ipv6 Routing Protoccol for Low-Power and Lossy Networks," IETF RFC 6550, 157 pages (2012).

* cited by examiner

COMMUNICATION SYSTEM, NODE, COMMUNICATION METHOD, AND COMPUTER PROGRAM PRODUCT

CROSS-REFERENCE TO RELATED APPLICATIONS

This application is based upon and claims the benefit of priority from Japanese Patent Application Nb. 2021-150318, filed on Sep. 15, 2021; the entire contents of which are incorporated herein by reference.

FIELD

Embodiments described herein relate generally to a communication system, a node, a communication method, and a computer program product.

BACKGROUND

Opportunistic routing is a packet transfer method that takes advantage of the characteristics of wireless communication, and is expected to shorten the transfer time and improve the reliability of packet transfer. In the conventional packet transfer method, packets are transferred hop-by-hop along a pre-established routing path, but in opportunistic routing, packets are not necessarily transferred along a pre-established routing path. For example, in the opportunistic routing, transferring by the intermediate node is omitted if the transmitted packet is received by the final destination node several hops away.

However, in the conventional techniques, it is not possible to suppress unnecessary retransmissions while realizing opportunistic routing without changing the standard MAC protocol.

DETAILED DESCRIPTION

According to an embodiment, a communication system includes a plurality of nodes that forms a wireless multi-hop network. One of the nodes includes a memory and one or more processors coupled to the memory. The one or more processors are configured Co: determine, when receiving a packet including path information that indicates a parent-child relationship of transfer nodes included on a network topology from a source node to a destination node, whether or not at least one of its own node and a neighboring node existing near the own node is included in the path information as the transfer node; specify a distance between the own node and the destination node when at least one of the own node and the neighboring node is included in the path information; and transmit a confirmation response for the packet to the wireless multi-hop network after a waiting time corresponding to the distance, and transfer the packet when a confirmation response is not received from the neighboring node during the waiting time.

Embodiments of a communication system, a node, a communication method, and a computer program product will be described in detail with reference to the accompanying drawings.

Conventional packet transfer methods include, for example, ExOR and ORPL.

In ExOR, a transmission node selects a plurality of transfer nodes from its neighboring nodes and enumerates the transfer nodes in a header of a transmission packet. The neighboring node that receives the transmitted packet refers to the header of the packet and transmits a confirmation response when the neighboring node is designated as the transfer node. In ExOR, since the closer the transfer node is to the destination, the earlier the confirmation response can be transmitted, if the confirmation response is received from another node earlier than the timing of the own confirmation response, the transfer of the packet is canceled. As a result, among the transfer nodes that have received the packet, only the node closest to the destination can transfer the packet.

ORPL realizes opportunistic routing on duty-cycled wireless communication. A transmission node continuously transmits transmission packets. The transmitting process by the transmission node is completed when a node that can be a transfer node among neighboring nodes receives the packet and returns a confirmation response to the transmission node. Whether or not the own node can become a transfer node when receiving a packet is determined using an RPL tree structure. In a case where the packet is an uplink packet heading for the root, the own node operates as a transfer node when the RPL Rank is smaller than the transmission node by a parameter w or more. Here, the parameter w is a threshold value used to avoid unnecessary transferring. In a case of downlink packets, the transfer nodes are enumerated in the routing header, or a bloom filter is used to represent a set of transfer nodes.

Opportunistic routing cannot be realized with IEEE 802.15.4, which is the standard MAC protocol, for both ExOR and ORPL.

In a first embodiment below, a communication system, a node, a communication method, and a program that realize opportunistic routing without changing the standard MAC protocol and suppress unnecessary retransmissions will be described.

First Embodiment

First, an example of a device configuration of a communication system according to the first embodiment will be described.

Example of Device Configuration

Figure 1:
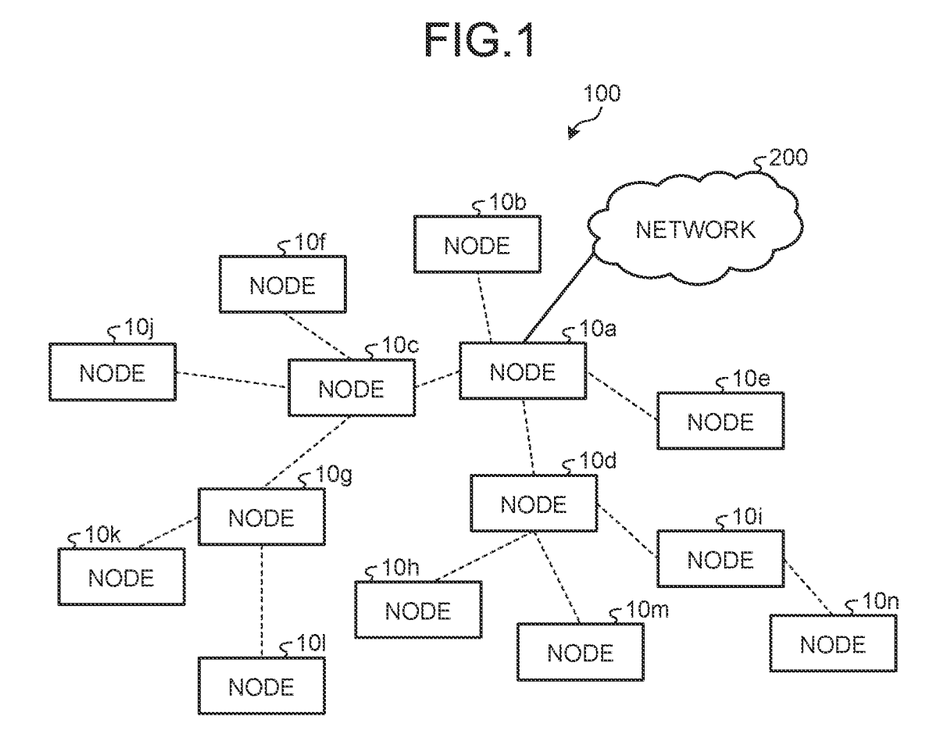
FIG. 1 is a diagram illustrating an example of a device configuration of a communication system according to a first embodiment.

FIG. 1 as a diagram illustrating an example of a device configuration of a communication system 100 according to the first embodiment. The communication system 100 of the first embodiment includes nodes 10a to 10n and a network 200.

The nodes 10a to 10n are communication devices forming a wireless multi-hop network. The dotted lines in FIG. 1 represent wireless links. The connection relationship represented by the dotted lines indicates a routing tree formed by the nodes 10a to 10n. Hereinafter, when the nodes 10a to 10n are not distinguished, they are simply referred to as a node 10.

The node 10a has a connection with the network 200 in addition to the wireless links with the nodes near the node 10a. Typically, the network 200 is the Internet. The node 10a operates as a router (a gateway, an aggregator, or a concentrator) that connects the wireless multi-hop network formed by the nodes 10a to 10n and the external network 200. It is noted that the node 10a does not always have to have a connection with the network 200.

Regarding the communication system 100 according to the first embodiment, a case where IEEE 802.15.4 is used as a wireless communication standard and IETF RFC. 6550 (RPL) is used as a routing protocol will be described as an example. The wireless communication standard is not limited to IEEE 802.15.4, and may be any wireless communication standard that communicates using the time division multiplexing method. For example, the wireless communication standard may be IEEE 802.11, Wi-SUN FAN, or the like, or may be an original communication standard. The routing protocol is not limited to RPL, and may be collection tree protocol (CTP) or other protocols.

Next, an example of the functional configuration of the node 10a according to the first embodiment will be described.

Example of Functional Configuration of Node 10a

Figure 2:
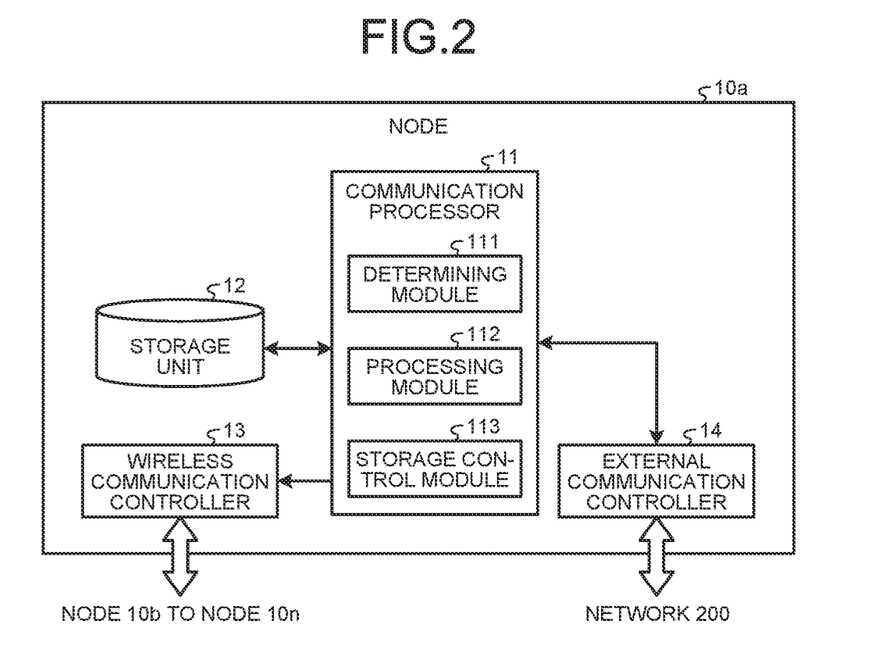
FIG. 2 is a diagram illustrating an example of a functional configuration of a node that operates as a router according to the first embodiment.

FIG. 2 is a diagram illustrating an example of a functional configuration of the node 10a operating as a router according to the first embodiment. The node 10a of the first embodiment includes a communication processor 11, a storage unit 12, a wireless communication controller 13, and an external communication controller 14.

The communication processor 11 includes a determining module 111, a processing module 112, and a storage control module 113.

The determining module 111 determines whether or not to transfer a packet received by the wireless communication controller 13. For example, when receiving a packet including path information that indicates a parent-child relationship of transfer nodes included on a network topology from a source node to a destination node, the determining module ill is configured to determine whether or not at least one of its own node and a neighboring node existing near the own node is included in the path information as the transfer node. The details of the operation of the determining module 111 will be described later using the flowchart of FIG. 6.

The processing module 112 performs network communication processing. For example, the processing module 112 controls a wireless multi-hop network composed of the nodes 10a to 10n, The control of the wireless multi-hop network includes, for example, a transmission control of control data for forming and maintaining the wireless multi-hop network, identification of a parent-child relationship of the nodes 10 constituting the wireless multi-hop network, and the like. The control data used for forming and maintaining the wireless multi-hop network is broadcast by the wireless communication controller 13 or unicast to a specific node 10.

Further, for example, the processing module 112 transfers packets between the wireless communication controller 13 and the external communication controller 14. Further, for example, the processing module 112 generates, transmits, and receives application data. The application data can be arbitrary. For example, the application data is sensor data acquired by a sensor application, or the like.

For example, when at least one of the own node and the neighboring node is included in path information, the processing module 112 specifies a distance between the own node and the destination node.

The storage control module 113 performs a storage control (reading, writing, etc.) of information stored in the storage unit 12.

The storage unit. 12 stores information that manages the network topology. For example, the storage unit 12 stores information on wireless multi-hop network control packets (for example, RPL control information) received from the nodes 10b to 10n.

Further, for example, the storage unit 12 stores information indicating a connection relationship between the node 10a and the node 10b. As will be described later, the nodes 10b to OI select an upper node (parent node) of the own node from neighboring nodes according to the wireless communication quality with the neighboring nodes. The information of the upper node and child node is transmitted from each of the nodes 10b to 10n to the node 10a by a network control packet. As a result, the minimum set of information that the storage unit 12 has as the information indicating the connection relationship is the information indicating the parent-child relationship of the nodes 10a to 10n. Based on this parent-child relationship information, the processing module 112 generates a network topology diagram of the entire network, and enumerates the nodes 10 existing between the node 10a and one specific node 10 on the network topology.

When a packet transmitted from the nodes 10b to 10n is received, the wireless communication controller 13 inputs the packet to the communication processor 11. The wireless communication controller 13 transmits a packet or a broadcast packet addressed to the nodes 10b to 10n received from the communication processor 11. Specifically, the wireless communication controller 13 transmits a confirmation response for the packet to the wireless multi-hop network after a waiting time according to the distance specified by the processing module 112, and transfers the packet when no confirmation response is received from the neighboring node during the waiting time.

The external communication controller 14 controls communication via the network 200. As described above, the node 10a does not have to include the external communication controller 14.

Next, an example of functional configurations of the nodes 10b to 10n of the first embodiment will be described.

Since the functional configurations of the nodes 10b to 10n are the same, the node 10b will be described as an example.

Figure 3:
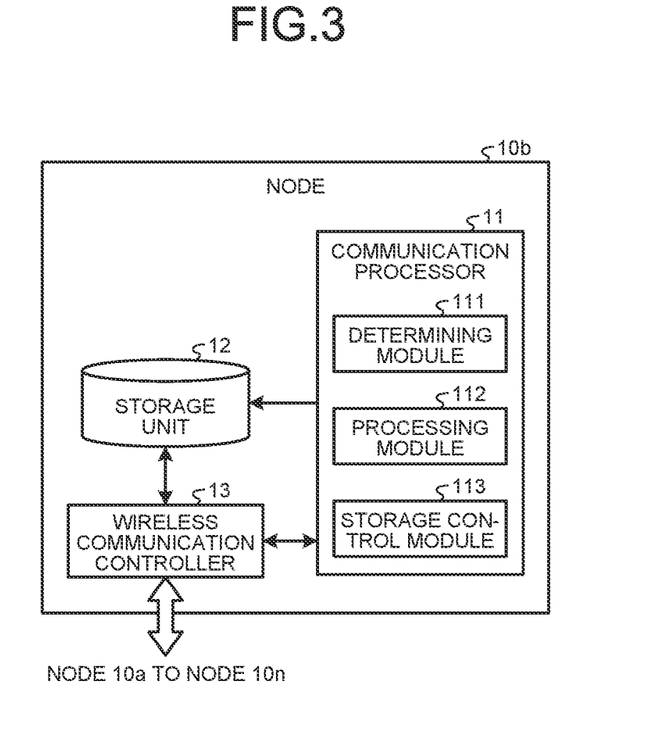
FIG. 3 is a diagram illustrating an example of a functional configuration of a normal node according to the first embodiment.

Example of functional configuration of node 10b FIG. 3 is a diagram illustrating an example of the functional configuration of the normal node 10b of the first embodiment. The node 10b of the first embodiment includes a communication processor 11, a storage unit 12, and a wireless communication controller 13.

The communication processor 11 includes a determining module 111, a processing module 112, and a storage control module 113.

The determining module 111 determines whether or not to transfer a packet received by the wireless communication controller 13. The details of the operation of the determining module 111 will be described later using the flowchart of FIG. 6.

The processing module 112 performs network communication processing. For example, the processing module 112 performs packet transfer process on a wireless multi-hop network formed by nodes 10a to 10n. Further, for example, the processing module 112 generates, transmits, and receives application data.

Further, for example, the processing module 112 controls the transmission of control data used for forming and maintaining a wireless multi-hop network. Further, for example, the processing module 112 receives the control data transmitted by the neighboring nodes of the node 10b (for example, the nodes 10a, 10c, and 10f in FIG. 1) via the wireless communication controller 13 and recognizes neighboring node information that indicates a neighboring node that exists near the own node. The control data is transmitted and received between the node 10b and the nodes 10a to 10n by being broadcast or multicast by the wireless communication controller 13 or unicast to a specific node. The neighboring nodes may be recognized by a method other than the control data reception.

The storage control module 113 performs d storage control (reading, writing, etc.) of information stored in the storage unit 12.

The storage unit 12 stores neighboring node information and rank information. The rank information is information that represents a relative distance from the node 10a on the network topology, and is expressed by the number of intermediate nodes (the number of hops), or may be communication quality information such as radio field strength and expected transmission count (ETX), or a value calculated in consideration of a node status information and the like, in addition to the number of intermediate nodes. The node status information is, for example, the number of child nodes or a remaining battery level when the node is battery-powered.

Example of Neighboring Node Information

The neighboring node information includes address information of each node 10 and an evaluation value of the wireless communication quality of each node 10. Typically, the information of each node 10 included in the neighboring node information is lifetime-manages and is automatically deleted if it is not updated for a certain period of time. In addition, at least one node 10 is selected as an upper node (parent node) of the node 10b from the neighboring nodes specified by the neighboring node information. In the example of FIG. 1, the node 10a is selected as the upper node of the node 10b.

There are various criteria for selecting an upper node depending on the application and the like. For example, the processing module 112 selects an upper node based on the wireless communication quality evaluated by received signal strength indication (RSSI), expected transmission count (ETX), a cost calculated using other metrics, and the like.

The upper node to be selected by the node 10b changes according to changes in the wireless environment. When a new upper node is selected or according to a predetermined interval or the like, the processing module 112 transmits a control packet including information on the new upper node to the node 10a via the wireless communication controller 13. When the node 10a receives and processes this control packet, the upper node of the node 10b (that is, the parent node when the child node is the node 10b) is recognized. The upper node of the node 10b is recorded in the storage unit 12 of the node 10a as parent-child relationship information.

Example of Rank Information

The processing module 112 calculates rank information of the own node according to the information of an upper node of the own node. The rank information is, for example, a smaller rank value when the node is being closer to the node 10a. The method of calculating the rank value differs depending on the routing protocol used, the rank calculation algorithm, and the like. Basically, the rank value of the own node is calculated by adding the evaluation value of the wireless communication quality with the upper node to the rank value of the upper node of the own node. Therefore, the rank value of the own node is larger than the rank value of the upper node. When the rank value of the own node is larger than the upper node, it can be recognized that the distance from the node 10a on the network topology is farther from the own node than the upper node. The processing module 112 acquires the rank information of the own node from the storage unit 12, broadcasts or multicasts this rank information as control data via the wireless communication controller 13, or unicasts the rank information to a specific node.

The wireless communication controller 13 transmits a packet or a broadcast packet, which is addressed to the nodes 10a, 10c to 10n and received from the communication processor 11. When a packet transmitted from the nodes 10a, 10c to 10n is received, the wireless communication controller 13 inputs the packet to the communication processor 11.

Example of Packet

Figure 4:
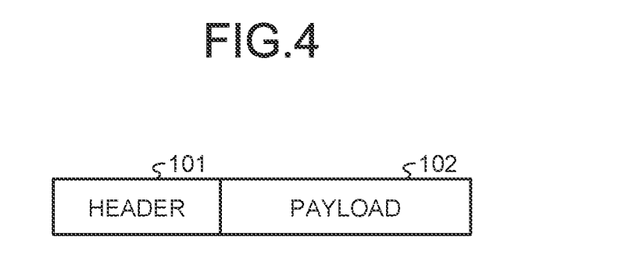
FIG. 4 is a diagram illustrating an example of a configuration of a packet transmitted and received between the nodes according to the first embodiment.

FIG. 4 is a diagram illustrating an example of a configuration of a packet transmitted and received between the nodes 10 of the first embodiment. The packet contains a header 101 and a payload 102. The header 101 includes a source address, a destination address, control information used for transferring, and the like of this packet. The payload. 102 contains data (for example, application data, etc.) generated by the source node and processed by the destination node. The wireless communication controller 13 may further add a header to the packet of FIG. 4.

Next, a transfer control method of the communication system 100 according to the embodiment will be described.

In the communication system 100 according to the embodiment, a packet stores transfer control information used for transferring the packet. For example, the transfer control information includes a rank value of the source node of the packet or a rank value of the transfer node (intermediate node) that relays the packet.

Further, for example, the transfer control information includes path information (connection of parent-child relationship) on the network topology from the source node to the destination node. The path information on the network topology may be expressed by enumerating the addresses of (intermediate) nodes on the path such as a source routing header, or may be expressed in a compressed format such as a bloom filter.

Figure 5:
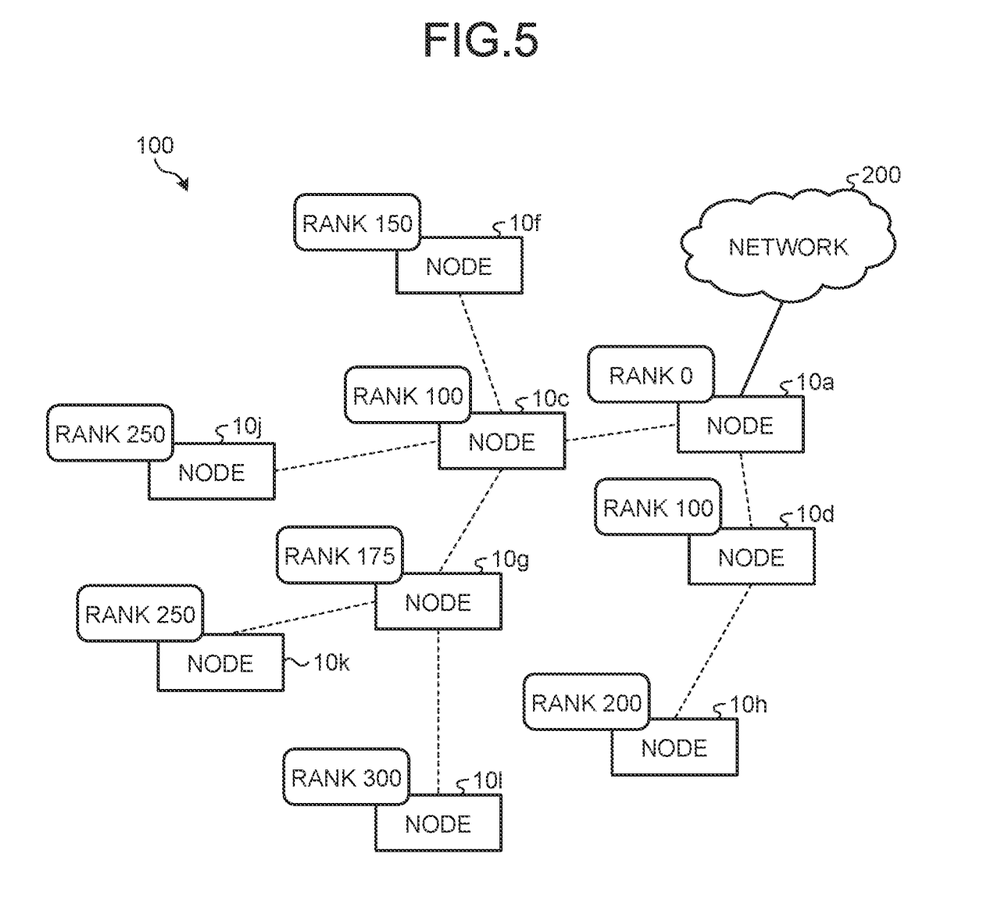
FIG. 5 is a diagram for explaining a transfer control method based on a rank value according to the first embodiment.

FIG. 5 is a diagram for explaining a transfer control method based on a rank value according to the first embodiment. In the example of FIG. 5, of the communication system 100 of FIG. 1, the nodes 10b, 10e, 10i, 10m, and 10n which are not used for explanation are omitted. As illustrated in FIG. 5, the rank value becomes larger as the node 10 is farther from the node 10a.

In a case where the rank information is used as the transfer control information used for transferring, for example, in, the header 101 of a packet sent from the node 10a to the node 10k, the wireless communication controller 13 of the node 10a sets the node 10a as the source address, sets the node 10k as the destination address, and sets a rank value (0) of the node 10a as the rank information.

On, the contrary, in, the packet from the node 10k to the node 10a, the source address and the destination address are exchanged, and a value 250, which is the rank value of the node 10k, is set in the rank information by the wireless communication controller 13 of the node 10k.

When the wireless communication controller 13 of the node 10g transfers the packet from the node 10a to the node 10k and, the packet from the node 10k to the node 10a, the rank value set in the packet is updated with a rank value (175) of the node 10g. The wireless communication controller 13 of the node 10g does not change the source address and the destination address.

On the other hand, when path information is used as transfer control information for transferring, information that identifies the nodes 10c and 10g (for example, address information and the like) is set in the header 101 of the packet from the node 10a to the node 10k by the wireless communication controller 13 of the node 10a. Information that identifies the nodes 10c and 10g is enumerated, for example, in the header 101 in order of proximity to the node 10a (root). As a result, the parent-child relationship of the transfer nodes included in the network topology from the source node to the destination node can be identified from, the path information stored in the header 101.

Further, information for identifying the nodes 10c and 10g is also set in the header 101 of the packet from the node 10k to the node 10a by the wireless communication controller 13 of the node 10k. In this case, the wireless communication controller 13 of the node 10k acquires the path information from the own node to the node 10a by some method. For example, the wireless communication controller 13 of the node 10k acquires the path information from its own node to the node 10a from the node 10a that stores the information for managing the network topology.

The rank value and the path information are not exclusive as the transfer control information included in the header 101. The transfer control information included in the header 101 may include both the rank value of the packet transfer node (or the packet source node) and, the path information from the source node to the destination node.

Example of Packet Reception Process

Figure 6:
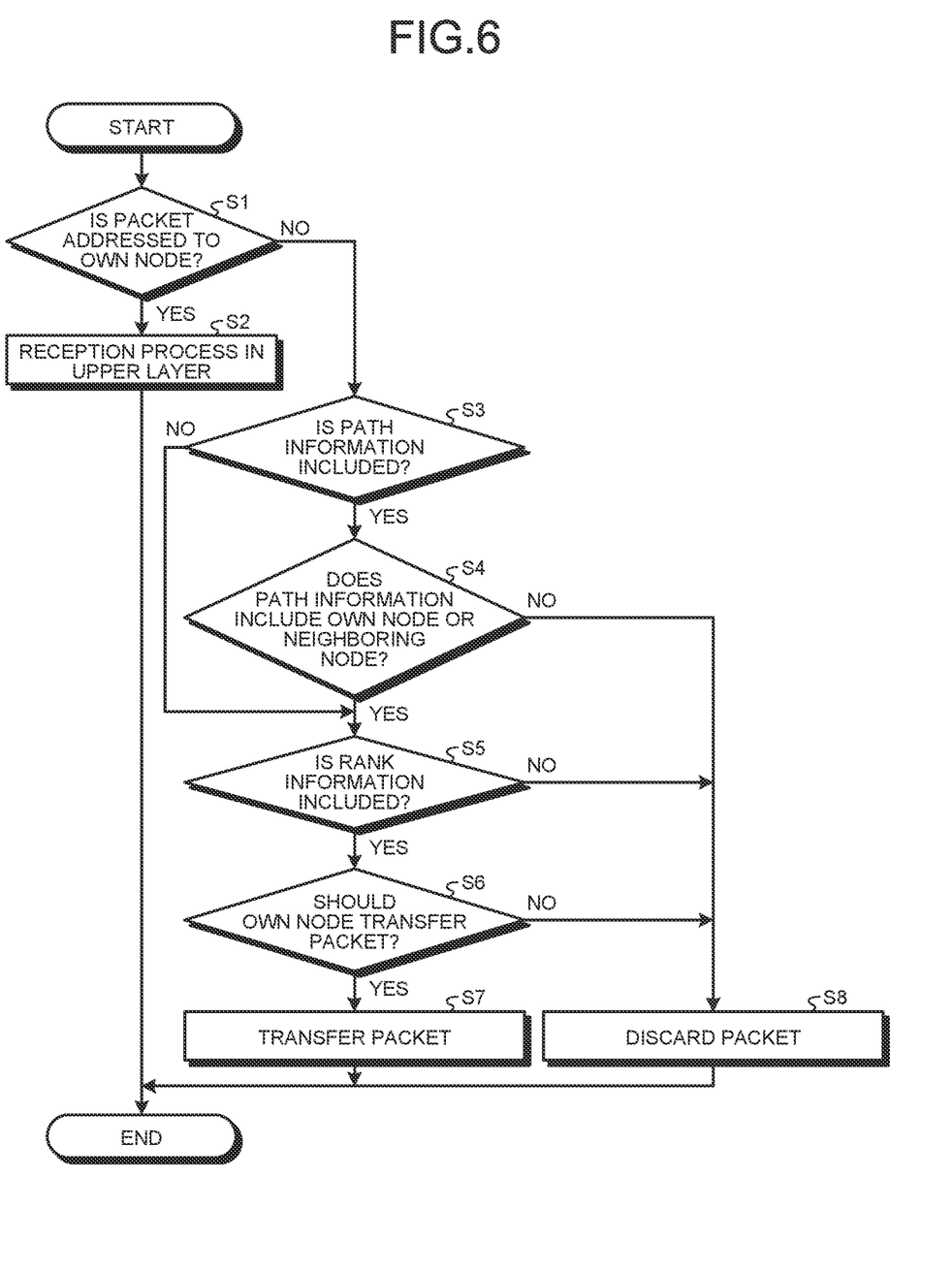
FIG. 6 is a flowchart illustrating an example of a packet reception process according to the first embodiment.

FIG. 6 is a flowchart illustrating an example of the packet reception process of the first embodiment. First, the determining module 111 confirms the destination node of the packet received by the wireless communication controller 13, and determines whether or not the packet is addressed to its own node (Step S1). When the packet is addressed to its own node (Step S1, Yes), for example, an upper layer such as a sensor application performs a packet reception process (for example, acquiring data contained in the packet) (Step S2).

When the packet is not addressed co the own node (Step S1, No), the determining module 111 determines whether or not the path information is included as the transfer control information in the header 101 of the packet (Step S3). When the path information is not included (Step S3, No), the process proceeds to Step S5.

When the path information is included (Step S3, Yes), the determining module 111 determines whether or not the own node or the neighboring node (at least one of the own node and the neighboring node) is included as a transfer node on the path between the source node and the destination node of the packet (Step S4). When the own node or the neighboring node is not included as a transfer node on the path (Step S4, No), the processing module 112 discards the packet (Step S8).

When the own node or the neighboring node is included as a transfer node on the path (Step S4, Yes), the determining module 111 determines whether or not rank information (rank value) is included in the header 101 of the packet as transfer control information. (Step S5). When the rank information is not included (Step S5, No), the processing module 112 discards the packet (Step S8).

When the rank information is included (Step S5, Yes), the determining module 111 determines whether or not the own node should transfer the packet based on a magnitude relationship between the rank value included in the packet and the rank value of the own node (Step S6). Specifically, when the destination of the packet is the node 10a, an external device connected to the network 200, or the like (when the packet is an uplink packet), and when the rank value of the own node is smaller than the rank value included in the packet transfer control information, the determining module 111 determines to transfer the packet. On the other hand, when the packet is a downlink packet sent away from the node 10a (root) in the wireless multi-hop network, and when the rank value of the own node is larger than the rank value included in the transfer control information of the packet, the determining module 111 determines to transfer the packet.

When the own node does not transfer the packet (Step S6, No), the processing module 112 discards the packet (Step S8).

When the own node transfers the packet (Step S6, Yes), the wireless communication controller 13 transfers the packet (Step S7). Details of the packet transfer process will be described later with reference to FIG. 7.

When, the own node generates a packet and transmits the packet as a source node, whether to use the rank information, path information, or both as transfer control information may be set as transfer control setting of the own node statically in advance or dynamically.

When it is set dynamically, for example, whether to use the rank information, path information, or both as transfer control information is set for each node according to an instruction from an external device or the like connected to the network 200 to each node 10.

Example of Packet Transfer Process

Figure 7:
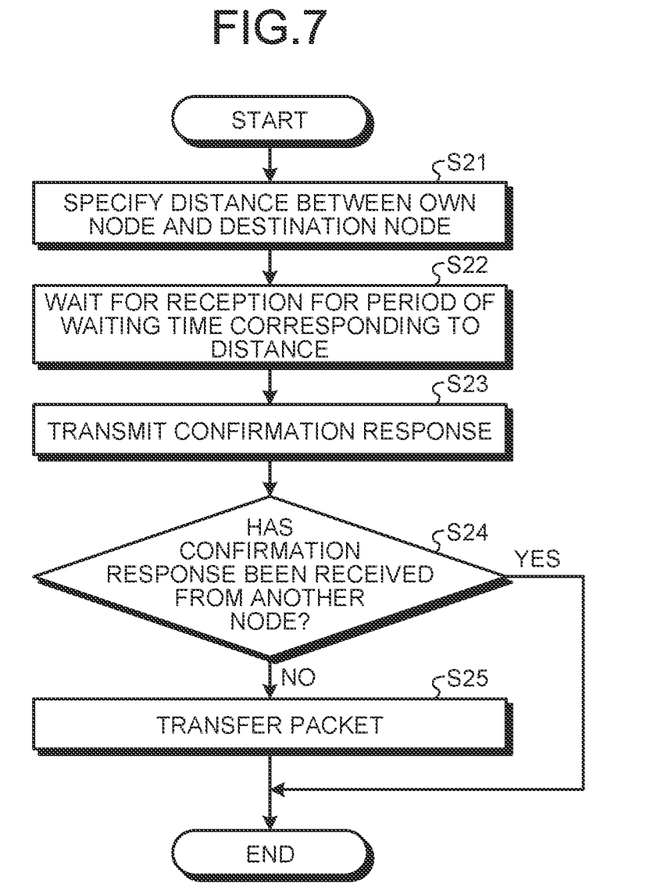
FIG. 7 is a flowchart illustrating an example of a packet transfer process according to the first embodiment.

FIG. 7 is a flowchart illustrating an example of a packet transfer process according to the first embodiment. When the packet is transferred in step S7 of FIG. 6, the processing module 112 specifies a distance between the own node and the destination node (Step S21).

This distance may be a logical distance on a wireless multi-hop network or a physical distance in real space. Information necessary for the node 10 that transfers the packet to specify the distance to the destination node may be included in the packet.

For example, in a case where the rank value of the destination node is included in the header 101 of the packet, the processing module 112 of the node 10 that transfers the packet may specify the logical distance on the wireless multi-hop network from the difference between the rank value of its own node and the rank value of the destination node.

Furthermore, for example, in a case where the number of hops between the node 10 that transfers the packet and a specific node 10 in the wireless multi-hop network can be calculated from a rank value or the like, the source node may add the number of hops between the source node and the destination node to the header 101 of the packet. The processing module 112 of the node 10 may specify the logical distance on, the wireless multi-hop network by using the number of hops.

Furthermore, for example, a network address according to the position of the node 10 on, the wireless multi-hop network may be assigned to each node 10. The processing module 112 of the node 10 that transfers the packet may specify the logical distance from the network address of its own node and the network address of the destination node.

Furthermore, for example, in a case where the processing module 112 of each node 10 statically or dynamically acquires coordinate information of a place where the node 10 is installed using a global navigation satellite system. (GNSS) or the like, the physical distance between the own node and the destination address may be specified from the coordinate information of the destination address included in the header 101 of the packet.

After the waiting time according to the distance specified by the method as described above (step S22), the wireless communication controller 13 of the node 10 that transfers the packet transmits a confirmation response for the packet to the wireless multi-hop network (step S23). The timing at which the confirmation response is transmitted may be the time obtained by adding the waiting time to the reception start time of the received packet, or may be the time obtained by adding the waiting time to the reception end time of the received packet. In addition, the waiting time may be calculated by adding a time varying according to the distance and a fixedly set time.

In the opportunistic routing, typically, the wireless communication controller 13 determines the waiting time such that the shorter the distance between the own node and the destination node, the shorter the waiting time. In addition, typically, regarding a plurality of nodes 10 having the same logical distance, the wireless communication controller 13 sets, based on the path information, a waiting time such that the node 10 included in the path information of the received packet has a shorter waiting time. However, the method of determining the waiting time according to the distance between the own node and the destination node is not limited, thereto.

In addition, in a reception waiting state that the wireless communication controller 13 is waiting to transmit a confirmation response (step S22), the period in which the reception waiting state is set may be the entire continuous period from a transfer determination to a confirmation response transmission, or may be a part of the entire continuous period (For example, the reception waiting state is periodically repeated for a predetermined period in the entire period).

Next, the determining module 111 determines whether a confirmation response for the packet to be transferred has been received from another node 10 during the reception waiting state in step S22 (step S24). When the confirmation response for the packet to be transferred is received (Step S24, Yes), the wireless communication controller 13 stops the transfer of the packet, and when the confirmation response for the packet co be transferred is not received (Step S24, No), the wireless communication controller 13 transfers the packet (Step S25).

Note that carrier sensing may be performed immediately before the transmission of the confirmation response. In a case where carrier sensing is performed and it is found that the channel for transmitting a confirmation response is busy as a result of carrier sensing, the wireless communication controller 13 cancels the transmission of the confirmation response and transfer of the packet.

The final destination node 10 also transmits a confirmation response for the received packet, similar to the transfer node in this case, the wireless communication controller 13 of the final destination node 10 calculates the waiting time until the confirmation response transmission assuming that, the distance between, the own node and the destination node is "none".

As described above, in the communication system. 100 of the first embodiment, when the determining module 111 receives a packet including path information indicating the parent-child relationship of the transfer node included in, the network topology from the source node to the destination node, it is determined whether or not at least one of the own node and the neighboring nodes existing near the own node is included in the path information as the transfer node. When at least one of the own node and the neighboring node is included in path information, the processing module 112 specifies a distance between, the own node and, the destination node. Then, the wireless communication controller 13 transmits a confirmation response for the packet to the wireless multi-hop network after the waiting time according to the distance, and transfers the packet when no confirmation response is received from the neighboring node during the waiting time.

With this configuration, according to the communication system 100 of the first embodiment, it is not possible to suppress unnecessary retransmissions while performing opportunistic routing without changing the standard MAC protocol.

For example, the following control can be performed for example, using a specific routing protocol name, according to the first embodiment. First, a parent-child relationship of the nodes 10 is created by RPL, in a wireless multi-hop network, packets are always transferred in IP-in-IP. The above-described transfer control information is stored in the external IP header. By using a non-unicast address (broadcast address or multicast address) as a destination of the MAC layer, an unspecified node 10 can perform a reception process without specifying the destination node 10.

The node 10 sets the RPL Rank. of its own node: in the transfer control information for the uplink packet addressed to the route of the RPL. When the received packet has the same RPL Rank as or a larger value than that of its own node, the node 10 transfers the packet. When a confirmation response for a packet to be transferred is received from a node having a RPL rank smaller than that of the own node while waiting for the transfer of the packet, the transfer of the packet to be transferred is canceled.

For the downlink packet, the RPL route follows the parent-child relationship to the destination node, and sets each IP address in the transfer control information (similar to the RPL Non-Storing mode). These addresses may be expressed in the form of a bloom filter. The node 10 transfers the packet when the address of the own node is included in the transfer control information. In addition, a node having an address included in the transfer control information in the neighboring node list also transfers the packet. When a confirmation response for the packet to be transferred is received from a node having a RPL rank higher than that of the own node while waiting for the transfer of the packet, the transfer of the packet to be transferred is canceled.

Note that, in the first embodiment, redundant transfer such as a control using the redundancy constant k of trickle algorithm may be performed in a case of determining whether or not to transfer a packet when the packet addressed to another node 10 is received.

Second Embodiment

Next, a second embodiment will be described. In the description of the second embodiment, the same description as that of the first embodiment will be omitted, and the parts different from the first embodiment will be described.

In the second embodiment, the wireless communication controller 13 of the node 10 transfers the packet and then retransmits the packet until the reception of the transferred packet is confirmed.

Example of Packet Reception Process

Figure 8:
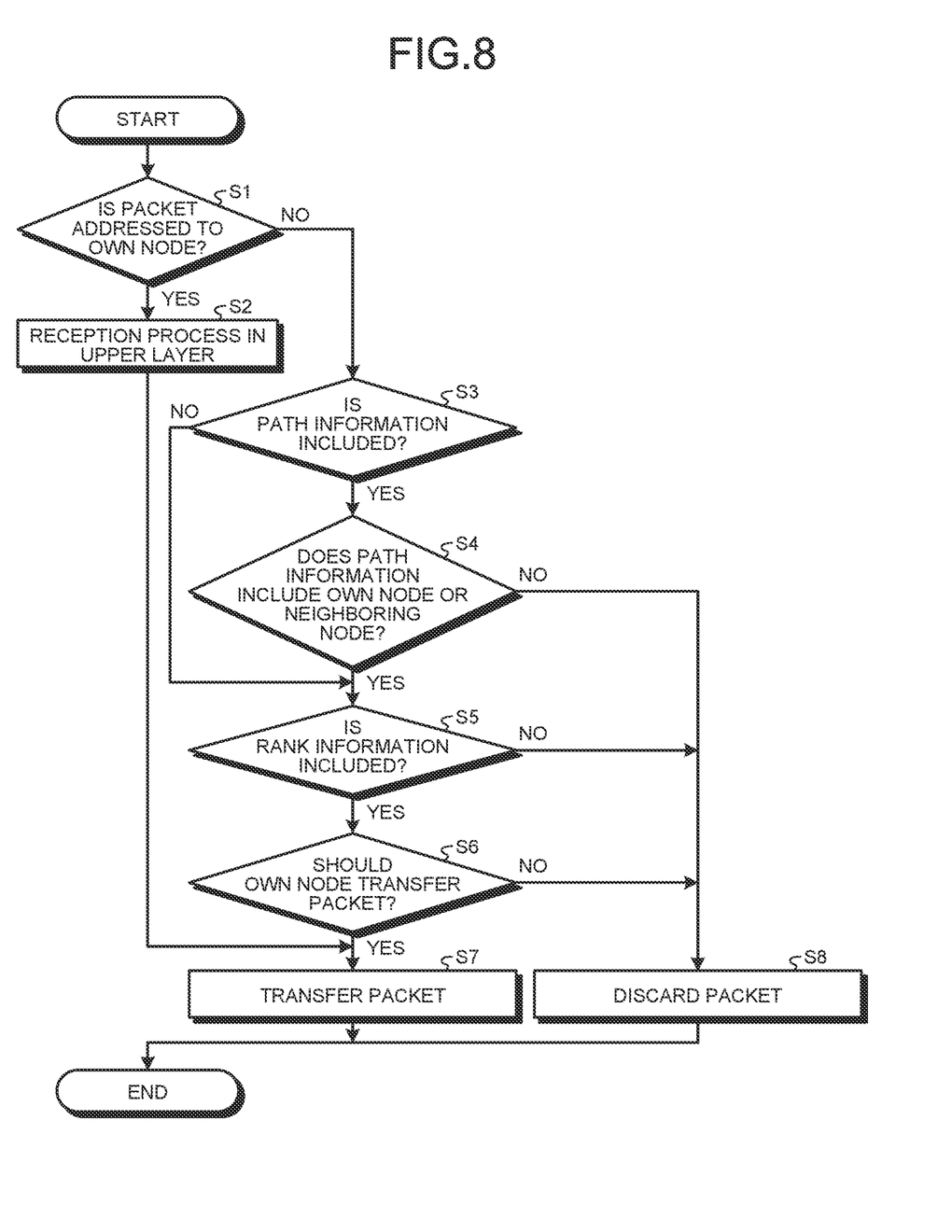
FIG. 8 is a flowchart illustrating an example of a packet reception process according to a second embodiment.

FIG. 8 is a flowchart illustrating an example of a packet reception process of the second embodiment. In FIG. 8, the process of Step S7 is executed after the process of Step S2, and the process of Step S7 is different from the flowchart of FIG. 6 described above.

Specifically, in the communication system. 100 of the second embodiment, even when, the node 10 that receives the packet is the final destination node, the packet is transferred (transmitted) by broadcasting or multicasting (Step S7) after the received packet is processed by the upper layer (Step S2). As a result, the node 10 that has transferred the packet to the final destination node can confirm the reception of the packet that has been transferred to the final destination node by receiving the packet transmitted from the final destination node in the process of Step S7.

Further, in the transfer process of Step S7, the wireless communication controller 13 of the transfer source node 10 performs a retransmission process when transferring the packet to the next transfer node. Specifically, the wireless communication controller 13 of the transfer source node 10 retransmits the packet until a packet broadcast or multicast from the next transfer node that has received the packet transferred by, the transfer source node 10 is received.

Even in the final destination node, since the packet is transferred (transmitted) by broadcast or multicast after the packet is processed by the upper layer (Step S2), the retransmission process executed in Step S7 is effective in a case where the packet is transferred to the final destination node.

According to the communication system 100 of the second embodiment, in addition to the effect of the first embodiment, it is possible to more reliably transfer packets in the wireless multi-hop network.

Third Embodiment

Next, a third embodiment will be described. In the description of the third embodiment, the same description as that of the first embodiment be omitted, and the parts different from the first embodiment will be described.

The third embodiment describes a case where a time division multiplexing wireless communication method such as time slotted channel hopping (TSCH) is used.

In, the third embodiment, the above-mentioned neighboring node information is stored not only in the storage unit 12 of the nodes 10b to 10n but also in the storage unit 12 of the node 10a. Further, in the neighboring node information of the third embodiment, the data transmission timing (transmission cell) of each neighboring node is also stored. The wireless communication controller 13 of each node 10 waits for reception in the transmission cell of the neighboring node, and performs a reception process of the packet transmitted (transferred) by the neighboring node.

In other words, in the communication system 100 of the third embodiment, the transmission timings of the plurality of nodes are controlled based on a transmission schedule in which each of the plurality of nodes has one transmission cell at a location different from other nodes. The wireless communication controller 13 of the node 10 receives the packet transferred by, the neighboring node at the transmission timing of the neighboring node based on the transmission schedule. In a case where the determining module 111 determines to transfer the packet transferred by the neighboring node, the wireless communication controller 13 transmits a confirmation response for the packet transferred by the neighboring node to the wireless multi-hop network when a waiting time according to the distance between the own node and the destination node has elapsed from the start time of the transmission cell that transmits the confirmation response.

Example of Transmission Schedule

Figure 9:
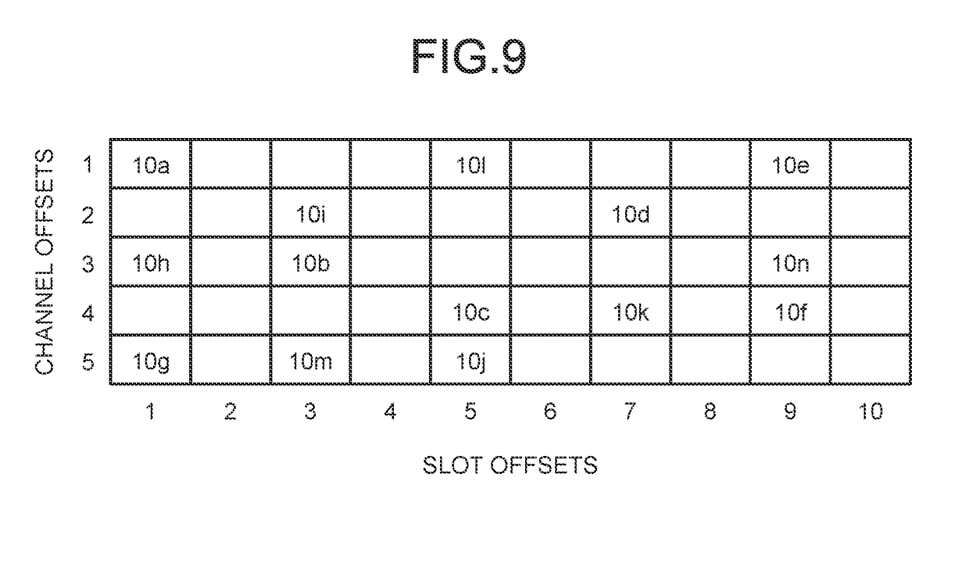
FIG. 9 is a diagram illustrating an example of a transmission schedule of time division multiplexing according to a third embodiment.

FIG. 9 is a diagram illustrating an example of a transmission schedule of time division multiplexing according to the third embodiment. In the example of FIG. 9, the transmission cell of each node 10 is allocated in a slot frame having ten slot offsets (time division multiplexing) and five channel offsets (frequency hopping). A transmission cell of a specific node 10 is not allocated to a cell adjacent to the transmission cell of each node 10. In this example, all the slot offsets to which the transmission cells are allocated by chance are odd numbers, but the allocation of the transmission cells may not be limited to the odd slot offsets or the even slot offsets.

When transferring the packet, the wireless communication controller 13 transmits a confirmation response in a cell on, the right of the cell that has received the packet. The timing of transmitting the confirmation response is determined by the distance between the own node and the destination node. Typically, the wireless communication controller 13 transmits the confirmation response at a timing closer to the head of the cell in which the confirmation response is transmitted (a timing closer to the start time of the cell) when the distance between the own node and the destination node is shorter.

Specifically, in a case where the TSCH is used, the wireless communication controller 13 realizes the control of the transmission timing of the confirmation response by dynamically determining the value of macTsCcaOffset according to the distance. A sufficiently large value is set for macTsRxHWait so that a source node or a transfer node that waits for this confirmation response can receive confirmation responses transmitted at various timings. The value of macTsRxOffset is also adjusted so as not to miss the confirmation response.

The wireless communication controller 13 of the node 10 that has received the confirmation response may use the confirmation response transmission timing determined by the source node and the time at which the reception of the confirmation response is actually started to match the clock of the own node with the clock of the source node of the confirmation response. Typically, when the rank of the source node of the confirmation response is smaller than the rank of the reception node of the confirmation response, the node 10 on the receiving side matches the clock of the own node to that of the source node.

The confirmation response transmission timing determined by the node 10 on the transmitting side can be specified by using position information indicating a logical location on the wireless multi-network in some form, for example, a rank of the source node included in the confirmation response, the number of hops from the specific node 10, a network address of the source node, and the like. For example, the processing module 112 specifies the position information indicating the logical position of the neighboring node on the wireless multi-network from the rank value included in the confirmation response received from the neighboring node.

The wireless communication controller 13 of the node 10 on the receiving side uses the same input and algorithm as those in a case where the node 10 on the transmitting side determines the confirmation response transmission timing, and specifies the timing. The wireless communication controller 13 of the node 10 on the receiving side adjusts to match the clock of the own node with the clock of the node 10 on the transmitting side by using the confirmation response transmission timing and the confirmation response reception time specified as described above in other words, the wireless communication controller 13 of the node 10 on the receiving side corrects the clock of the own node on the basis of the difference between the reception timing of the confirmation response transmitted from the neighboring node and the transmission timing of the confirmation response specified from the position information of the neighboring node in the wireless multi-hop network.

In a case where the clocks of the nodes are completely synchronized, the confirmation response transmission timing specified by the node 10 on the receiving side and the actual confirmation response reception time completely match. In a case where the clock of the node 10 on the receiving side is delayed from the clock of the node 10 on the transmitting side, the actual confirmation response reception time is earlier than the confirmation response transmission timing specified by the node 10 on the receiving side.

Fourth Embodiment

Next, a fourth embodiment will be described. In, the description of the fourth embodiment, the same description as that of the first embodiment will be omitted, and the parts different from the first embodiment will be described.

In, the fourth embodiment, the details of the transferred packet will be described.

Example of Packet

Figure 10:
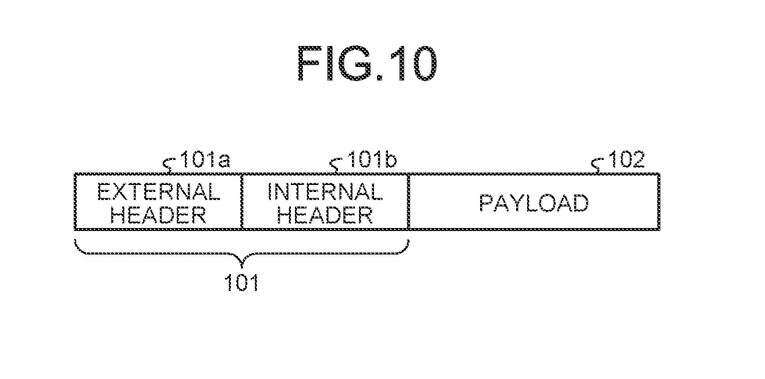
FIG. 10 is a diagram illustrating an example of a configuration of a packet transmitted and received between the nodes according to a fourth embodiment.

FIG. 10 is a diagram illustrating an example of a configuration of a packet transmitted and received between the nodes 10 according to the fourth embodiment. The header 101 of the packet of the fourth embodiment is divided into an external header 101a and an internal header 101b. Information on the source node and the destination node is stored in the internal header 101b.

The above-mentioned transfer control information is stored in the external header 101a. Further, the external header 101a stores the address of the transfer node that has transferred the packet as the source address. When the packet is transmitted from the source node that has generated the packet, the source address of the external header 101a and the source address of the internal header 101b are the same (the address of the source node). A broadcast address or a multicast address is stored in the destination address of the external header 101a. In other words, the wireless communication controller 13 transfers the packet by broadcasting or multicasting.

The wireless communication controller 13 may further add a header to the packet of FIG. 10.

Finally, an example of a hardware configuration of the node 10 according to the first to fourth embodiments will be described.

Example of Hardware Configuration

Figure 11:
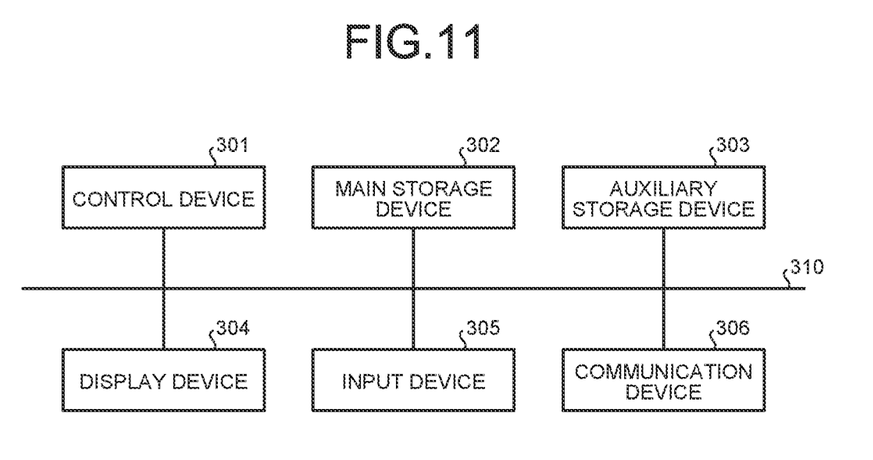
FIG. 11 is a diagram illustrating an example of a hardware configuration of the node according to the first to fourth embodiments.

FIG. 11 is a diagram illustrating an example of the hardware configuration of the node 10 according to the first to fourth embodiments. The node 10 of the first to fourth embodiments includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

The control device 301 executes a program read from the auxiliary storage device 303 to the main storage device 302. The main storage device 302 is a memory such as ROM and RAM. The auxiliary storage device 303 is a hard disk drive (HDD), a memory card, or the like. The storage unit 12 of FIGS. 2 and 3 corresponds to the main storage device 302 and the auxiliary storage device 303.

The display device 304 displays a status of the node 10 and the like. The display device 304 is, for example, a liquid crystal display or the like. The input device 305 is an interface for operating the node 10. The input device 305 is, for example, a button provided at the housing of the node 10. The display device 304 and the input device. 305 may be realised by a touch panel or the like having a display function and an input function. Further, the node 10 does not have to include the display device 304 and the input device 305.

The communication device 306 is an interface for communicating with another node 10, an external device, and the like.

The program executed on the node 10 of the first to fourth embodiments is a file in an installable format or an executable format, and is provided as a computer program product being recorded in a computer-readable storage medium such as a CD-ROM, a memory card, a CD-R, or a MID.

Further, the program executed by the node 10 of the first to fourth embodiments may be stored on a computer connected to a network such as the Internet and provided to be downloaded via the network. Further, the program executed on the node 10 of the first to fourth embodiments may be configured to be provided via a network such as the Internet without being downloaded.

Further, the program of the node 10 of the first to fourth embodiments may be configured to be provided by being stored in advance in a ROM or the like.

The program executed by the node 10 of the first to fourth embodiments has a modular structure including some of the functional blocks of the node 10a of FIG. 2 and the functional blocks of the nodes 10b to 10n of FIG. 3, which can be realized by the program. In the actual hardware, each functional block is loaded on the main storage device 302 by the control device 301 reading a program from the storage medium and executing the program. In other words, each of the above functional blocks is generated on the main storage device 302.

Note that some or all of the above described functional blocks illustrated in FIGS. 2 and 3 may be realized by hardware such as an IC, not by software.

When each function is realized by using a plurality of processors, each processor may realize one of each function, or may realize two or more of each function.

While certain embodiments have been described, these embodiments have been presented by way of example only, and are not intended to limit the scope of the inventions. Indeed, the novel embodiments described herein may be embodied is a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
a plurality of nodes that forms a wireless multi-hop network, one of the nodes comprising:
a memory; and
one or more processors coupled to the memory and configured to:
determine, when receiving a packet including path information that indicates a parent-child relationship of transfer nodes included on a network topology from a source node to a destination node, whether or not at least one of its own node and a neighboring node existing near the own node is included in the path information as the transfer node;
specify a distance between the own node and the destination node when at least one of the own node and the neighboring node is included in the path information; and
transmit a confirmation response for the packet to the wireless multi-hop network after a waiting time corresponding to the distance, and transfer the packet when a confirmation response is not received from the neighboring node during the waiting time.

2. The system according to claim 1, wherein
transmission timings of the plurality of nodes are controlled based on a transmission schedule in which each the plurality of nodes has one transmission cell at a location different from other nodes, and
the one or more processors are configured to: receive a packet transferred from the neighboring node at a transmission timing of the neighboring node based on the transmission schedule; and transmit, when it is determined that the packet transferred from the neighboring node is to be transferred, a confirmation response for the packet transferred by the neighboring node to the wireless multi-hop network when the waiting time has passed from a start time of a transmission cell that transfers the confirmation response.

3. The system according to claim 1, wherein
the one or more processors are configured to correct a clock of the own node based on a difference between a reception timing of the confirmation response transmitted from the neighboring node and a transmission timing of a confirmation response specified based on position information of the neighboring node in the wireless multi-hop network.

4. The system according to claim 3, wherein
the confirmation response includes a rank value of the neighboring node that has transferred the confirmation response, and the one or more processors are configured to specify the position information of the neighboring node based on the rank value included in the confirmation response.

5. The system according to claim 1, wherein
the one or more processors are further configured to:
determine, when a rank value is further included in the packet, whether or not to transfer the packet based on a magnitude relationship between the rank value included in the packet and a rank value of the own node; and
transmit the confirmation response for the packet to the wireless multi-hop network after the waiting time when least one of the own node and the neighboring node is included in the path information and when it is determined to transfer the packet based on the magnitude relationship, and update the rank value of the packet with the rank value of the own node and transfer the packet when a confirmation response is not received from another node during the waiting time.

6. The system according to claim 5, wherein
the one or more processors are configured to specify the distance based on a difference between the rank value of the own node and a rank value of the destination node.

7. The system according to claim 2, wherein
the wireless multi-hop network is composed of the plurality of nodes in a tree structure, and
in the transmission schedule, transmission cells of the plurality of nodes at respective different locations are determined using time division multiplexing and frequency hopping.

8. A node that forms a wireless multi-hop network, the node comprising:
a memory; and
one or more processors coupled to the memory and configured to:
determine, when receiving a packet including path information that indicates a parent-child relationship of transfer nodes included on a network topology from a source node to a destination node, whether or not at least one of its own node and a neighboring node existing near the own node is included in the path information as the transfer node;
specify a distance between the own node and the destination node when at least one of the own node and the neighboring node is included in the path information; and
transmit a confirmation response for the packet the wireless multi-hop network after a waiting time corresponding to the distance, and transfer the packet when a confirmation response is not received from the neighboring node during the waiting time.

9. A computer program product for a plurality of nodes that forms a wireless multi-hop network, the computer program product comprising a non-transitory computer-readable medium including programmed instructions, the instructions causing a computer of one of the nodes to execute:
determining, when receiving a packet including path information that indicates a parent-child relationship of transfer nodes included on a network topology from a source node to a destination node, whether or not at least one of its own node and a neighboring node existing near the own node is included in the path information as the transfer node;

specifying a distance between the own node and the destination node when at least one of the own node and the neighboring node is included in the path information; and transmitting a confirmation response for the packet to the wireless multi-hop network after a waiting time corresponding to the distance, and transferring the packet when a confirmation response is not received from the neighboring node during the waiting time.

\* \* \* \* \*

UNITED STATES PATENT AND TRADEMARK OFFICE
CERTIFICATE OF CORRECTION

| | | |
|---|---|---|
| PATENT NO. | : 11,736,384 B2 | |
| APPLICATION NO. | : 17/681663 | |
| DATED | : August 22, 2023 | |
| INVENTOR(S) | : Yasuyuki Tanaka | |

It is certified that error appears in the above-identified patent and that said Letters Patent is hereby corrected as shown below:

In the Claims

Claim 5, Column 16, Line 13, "least" should read as --at least--.

Signed and Sealed this
Sixth Day of February, 2024

Katherine Kelly Vidal
*Director of the United States Patent and Trademark Office*